(12) United States Patent
Wang

(10) Patent No.: US 6,864,929 B2
(45) Date of Patent: Mar. 8, 2005

(54) SECURE FRAME FOR LIGHT MODULE (75) Inventor: Yao-Tung Wang, Tao-Yuan (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 0 days.

(21) Appl. No.: 10/419,734

(22) Filed: Apr. 22, 2003

(65) Prior Publication Data

US 2004/0212754 A1 Oct. 28, 2004

(51) Int. Cl.[7] ............................................. G02F 1/1333
(52) U.S. Cl. ...................... 349/58; 361/681; 361/714; 361/752; 455/90
(58) Field of Search ........................... 349/58; 361/681, 361/714, 752; 455/90

(56) References Cited

U.S. PATENT DOCUMENTS 6,055,029 A * 4/2000 Kurihara et al. ............... 349/65
6,734,928 B2 * 5/2004 Ito et al. ......................... 349/58
2002/0181188 A1 * 12/2002 You et al. .................... 361/681
2003/0016313 A1 * 1/2003 Jeong ........................... 349/58

* cited by examiner

Primary Examiner—Huyen Ngo
(74) Attorney, Agent, or Firm—Birch, Stewart, Kolasch & Birch, LLP (57) ABSTRACT A secure frame for light module, which is essentially divided into a secure structure surrounding the light module and many secure protrusions located between the secure structure and light module. Herein, each secure protrusion is connected only with the light module or with the secure structure. The shorter distance between the secure protrusions and the light module (or the secure structure) provides the essential support to the light module. The longer distance between the light module and the secure structure provides the elastic space for the light module to absorb the effects of heat, light, shock, and so on.

20 Claims, 9 Drawing Sheets

SECURE FRAME FOR LIGHT MODULE

BACKGROUND OF THE INVENTION

1. Field of the Invention

The invention relates to the secure frame for light module, and more particularly, to the shape changing of the light module and/or the secure frame of light module for absorbing the variation, such as movement and deformation, of the light module induced by thermal or optical factor(s).

2. Description of the Prior Art

From production of the scan head of the scanner to that of the panel of the liquid crystal display in contemporary industry, the application of light module that contains light module has rapidly increased since the light module containing light module provides a plane light source by distributing the light emitted from a point source or a line source on the whole surface of the light module and contains optical films such as color filter and polarizing film for changing the properties of light emitted from the plane light source. And since the function of this kind of light module is to from a plane light source and adjust the properties of light emitted from the plane light source, the key of normal operation of the light module depends strongly on whether there is deformation in the light module, whether there is deformation or crack in each element (light guide plate, polarizing film, and color filter, etc.) of the light module, and whether the relative geometric relation between the light module and other elements in the product is misaligned or changed.

Figure 1A:
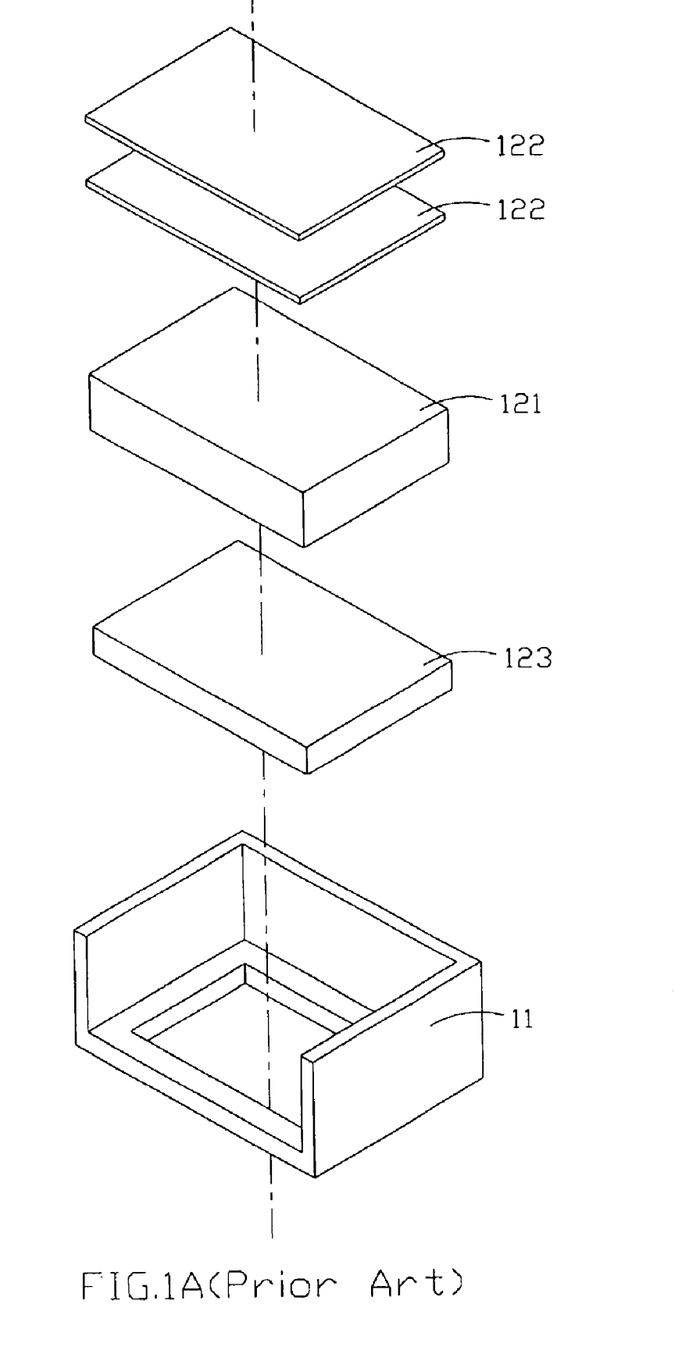
FIG. 1A to FIG. 1F show the essential structure of conventional secure frame for light module and the common defects of conventional secure frame for light module.
Figure 1B:
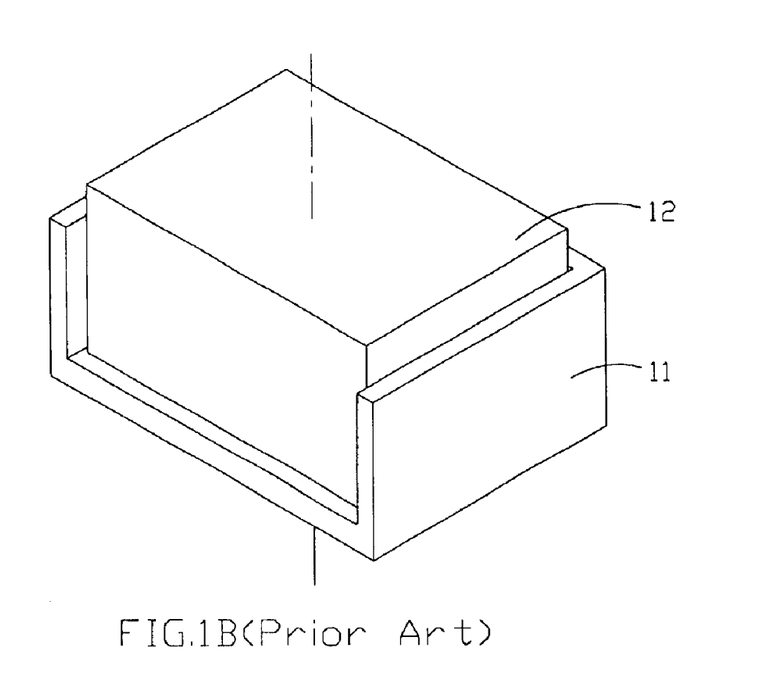
Figure 1C:
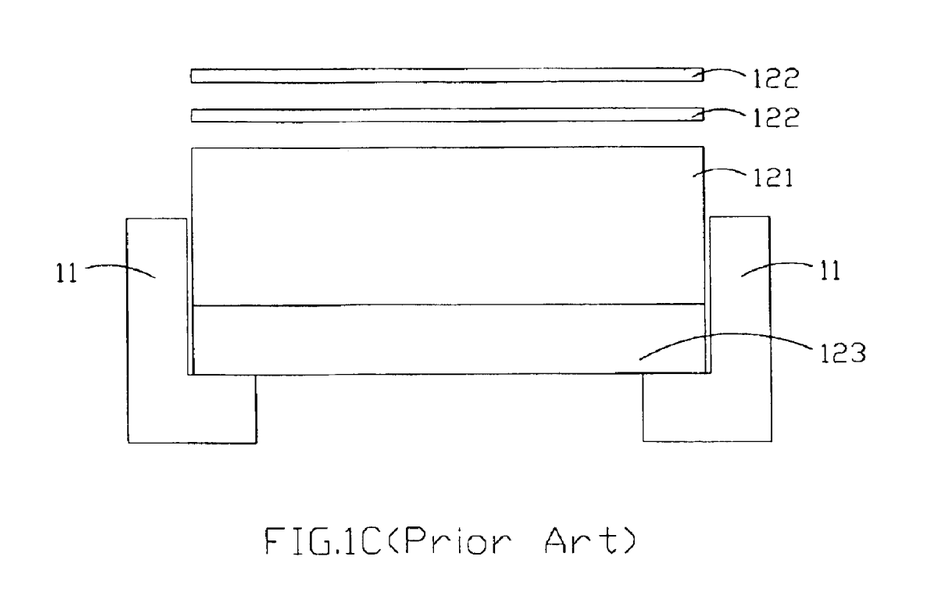
Figure 1D:
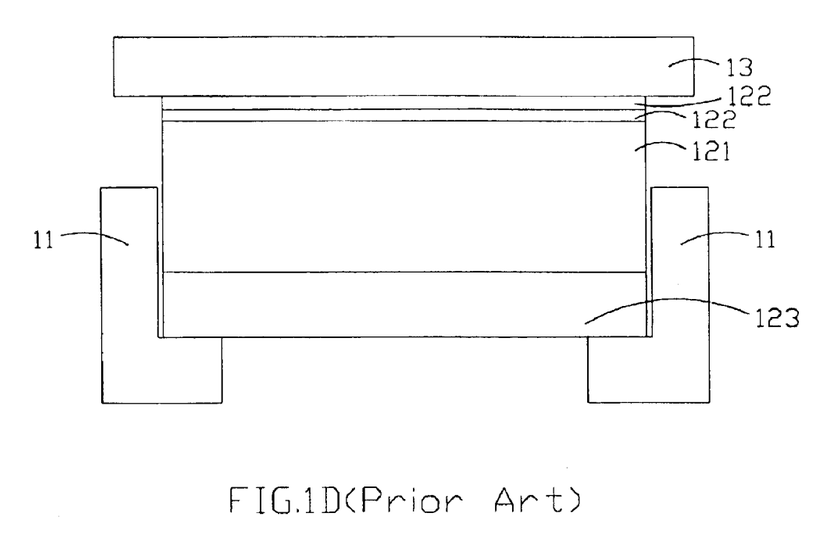

In the prior art, as shown in FIG. 1A to FIG. 1C, secure frame 11 is usually used to surround and fix light module (may contain light guide plate 121, light film 122, and reflective plate 123) 12. Herein, secure frame 11 is not usually right next to (or does not usually directly contact with) the sidewall of light module 12 but supports light module 12 from the side of light module 12 that is not surrounded by secure frame 11. Moreover, the distance between secure frame 11 and the sidewall of light guide 12 is constant and uniformly distributed. Therefor, when the fabrication of the whole product is completed, as shown in FIG. 1D, secure frame 11 could effectively fix the relative geometric relation between light guide 12 and corresponding element 13, such as liquid crystal module of liquid crystal display, and could effectively reduce the risk of both deformation(s) and crack(s).

Figure 1E:
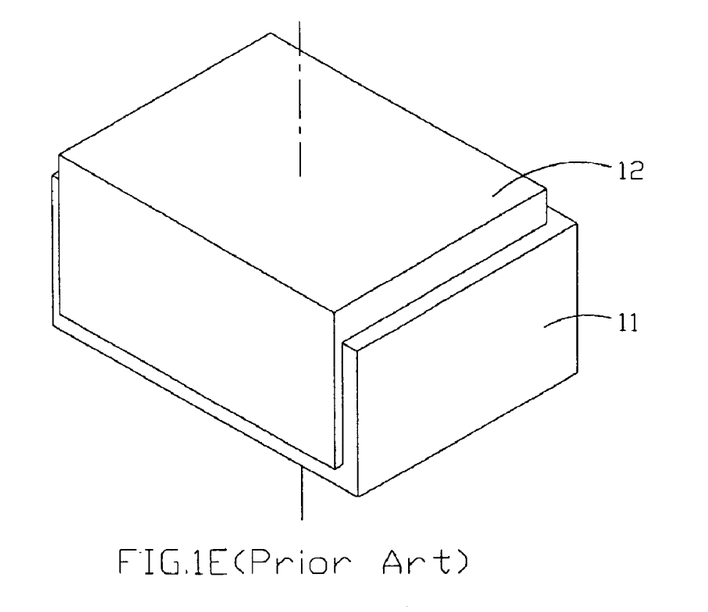
Figure 1F:
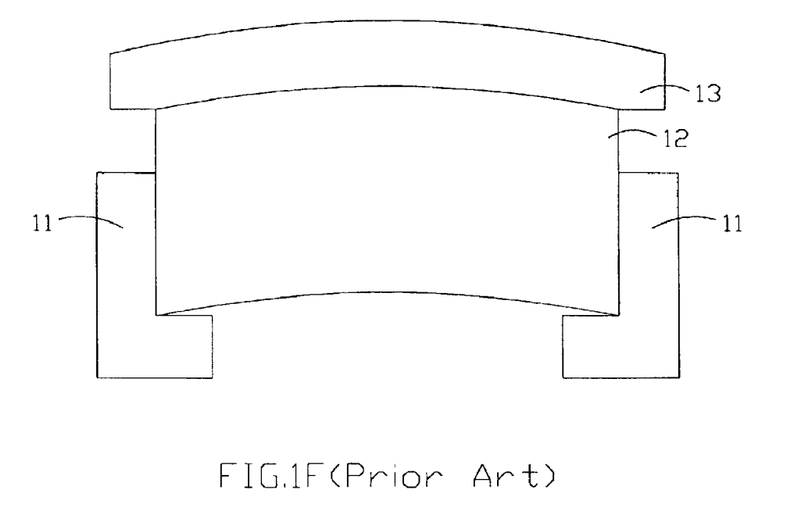

However, while light guide 12 is broadly appreciated in many newly appeared cases, the conventional secure frame 11 is not suitable for all newly appeared cases. For example, during the testing process after the liquid crystal display is made, the liquid crystal display is operated under an extreme condition, such as high voltage and high temperature and extreme change of temperature, to simulate the long operating period. And, as shown in FIG. 1E and FIG. 1F, the practical testing result shows that light module 12 usually has crack(s) or is deformed, and usually causes the corresponding element 13 next to light module 12 to deform.

Therefore, while the light module is indispensable, it is desired to develop a new secure frame for light module to ensure the light module could be broadly applied in the contemporary industry.

SUMMARY OF THE INVENTION

One purpose of the invention is to provide a secure frame for light module, and more particularly, to provide a secure frame that could absorb the variation, such as movement and inflation, of the light module induced by thermal or optical factor(s).

Another purpose of the invention is to provide a secure frame for light module, and more particularly, to provide a secure frame that could effective prevent deformation(s) and crack(s).

Still an purpose of the invention is to provide a secure frame for light module, and more particularly, to provide a secure frame could effectively protect display against damages during testing process.

The secure frame for light guide provided by the invention could be divided into two essential parts: secure structure that surrounds the light module, and many secure protrusions that are located between the secure structure and the light module. Herein, each secure protrusion is contacted only with the light module or with the secure structure; when certain secure protrusion is directly connected with secure structure (or light module), the distance between secure protrusion and secure structure (or light module) is shorter than that between secure structure and light module. Moreover, the details of each secure protrusion, such as length, width and location, are adjusted to let the shorter distance between the secure protrusion and the light module (or secure structure) provide essential support to the light module, and to let the longer distance between the secure structure and the light module provide an elastic space to absorb the variation, such as movement and inflation, of the light module induced by thermal or optical factor(s).

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

One preferred embodiment of the present invention is a secure frame for light module. The secure frame for light module is used to secure and support a light module. The light module and the secure frame are located on the same side of a light assembly, such as the scan head of the scanner or the liquid module of the liquid crystal display. As shown in FIG. 2A to FIG. 2G, the embodiment comprises: first secure structure 21, second secure structure 22, third secure structure 23, and at least one secure protrusion 24 What is emphasized here is that, the focus of the present embodiment is on the supported light module 25, secure structure 21/22/23 (around the side of light module 24), and secure protrusion 24 in between. The main difference between the embodiment and prior art is way of arrangement of secure protrusion 24 shown in top-view of secure frame.

Figure 2A:
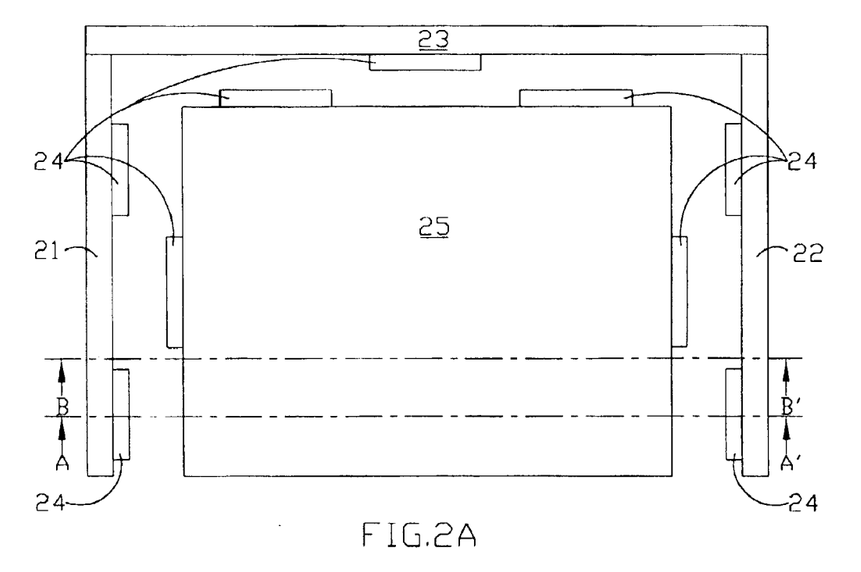
FIG. 2A to FIG. 2G show the essential structure of one preferred embodiment of the present invention.
Figure 2B:
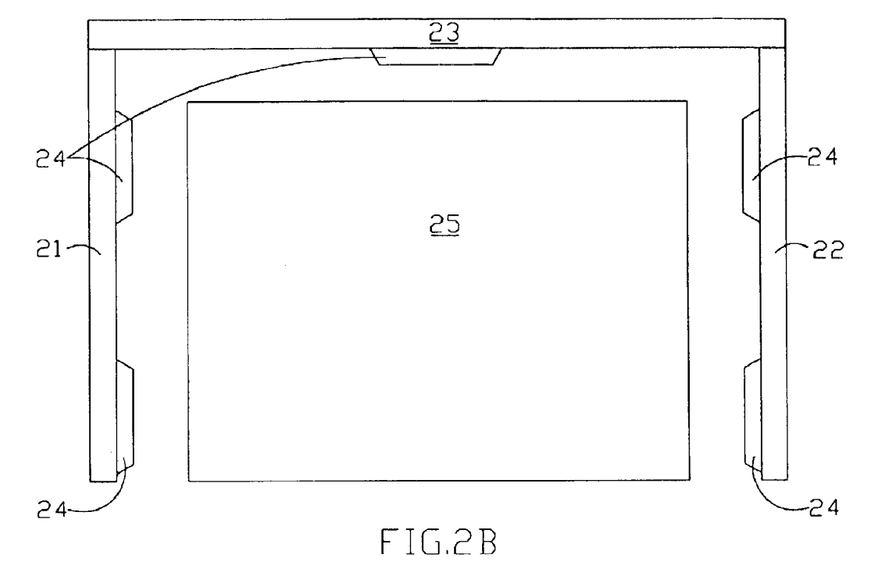
Figure 2C:
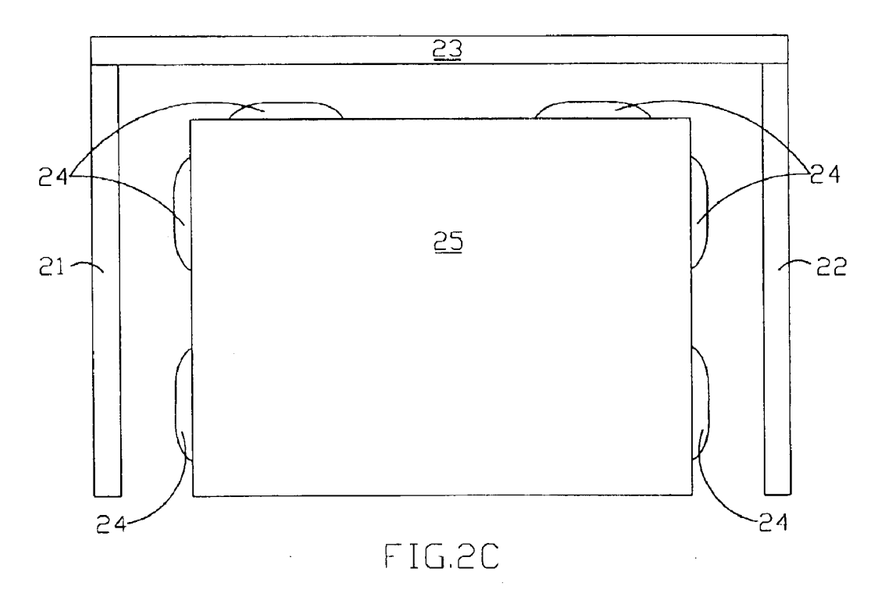
Figure 2D:
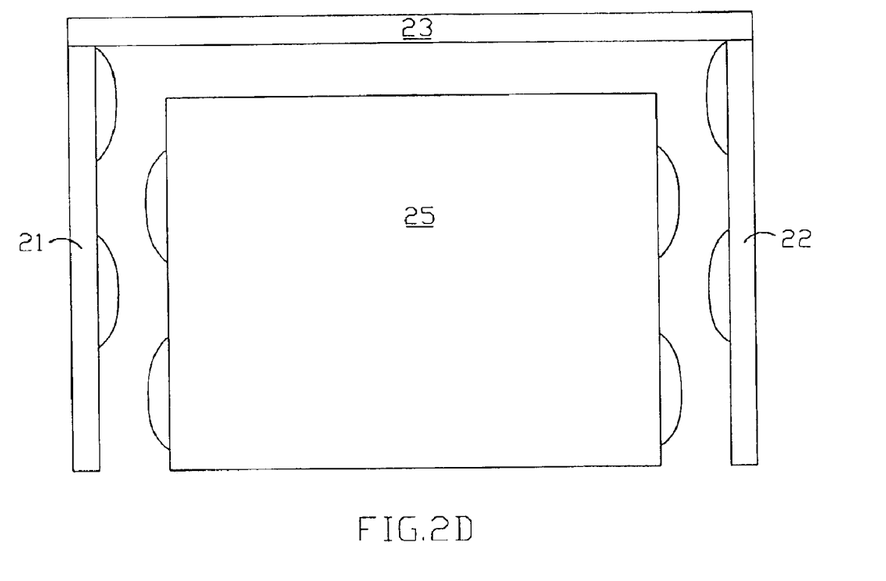
Figure 2E:
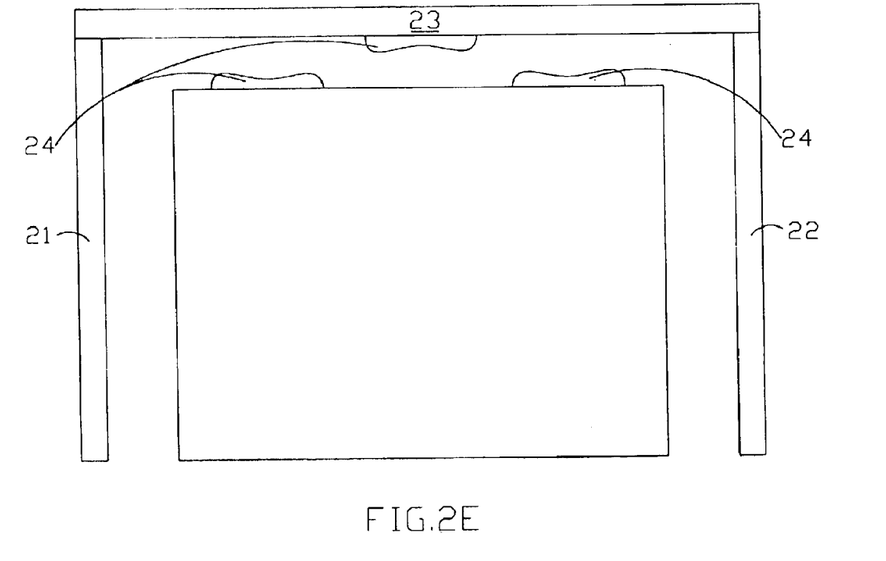
Figure 2F:
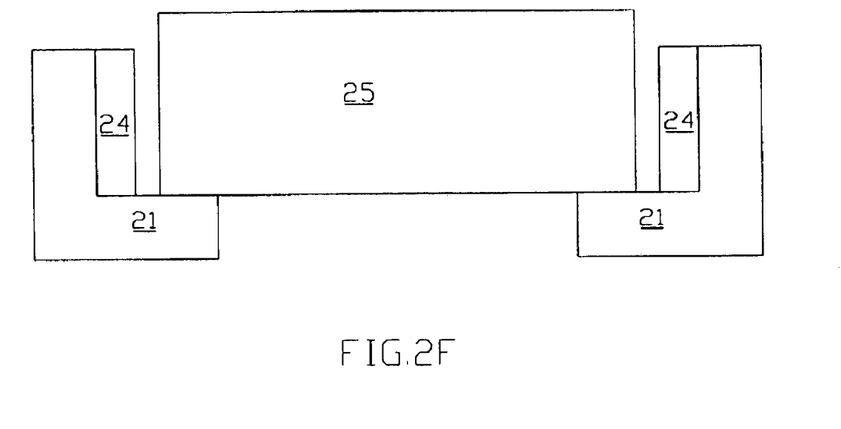
Figure 2G:
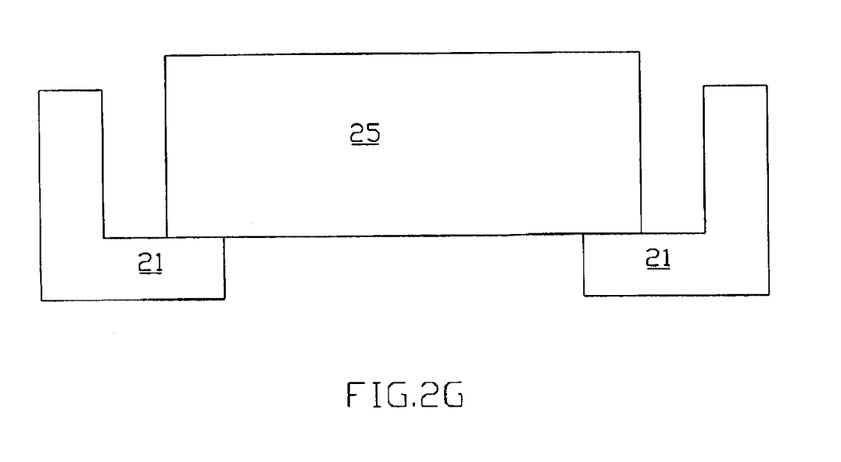

Therefore, part of secure structure 21/22/23 on the bottom of light module 25 will not be specially displayed in FIG. 2A to FIG. 2G in order to simplify the drawings and emphasize the focal point; besides, cross-section view of FIG. 2A from line AA' (both sides of which going through secure protrusion 24) and line BB' (both sides of which not going through secure protrusion 24) are shown respectively in FIG. 2F and FIG. 2G.

First secure structure 21 is located on first side of light module 25 and is separated from light module 25. And, when number of secure protrusion(s) 24 on first side is no smaller than three, the arrangement of the secure protrusion(s) 24 forms a plane.

Second secure structure 22 is located on second side of light module 25 and is separated from light module 25. Herein, first side and second side of light module 25 are two opposite side. And, when number of secure protrusion(s) 24 on second side is no smaller than three, the arrangement of the secure protrusion(s) 24 forms a plane.

Third secure structure 23 is located on third side of light module 25 and is separated from light module 25, third secure structure 23 being connected with first secure structure 21 and second secure structure 22 at the same time. And, when number of secure protrusion(s) 24 on third side is no smaller than three, the arrangement of the secure protrusion(s) 24 forms a plane.

In the embodiment, in order to make secure protrusion 24 exert pressure evenly on light module 25 (or secure structure 21/22/23) for reducing the possibility of deformation caused by receiving pressure unevenly, the deployment of secure protrusion 24 on first side and deployment of secure protrusion 24 on second side can be made symmetrical to each other, and the deployment of secure protrusion 24 on third side can also be made symmetrical on both left and right sides.

Besides, the embodiment only demands the pressure exerted upon light module 25 (or secure structure 21/22/23) by secure protrusion 24 to be exerted evenly. The shape of any secure protrusion 24, or whether the shape of all secure protrusions 24 are the same, is not limited in the embodiment. The secure protrusion 24 can be in any possible shape, such as semi-circle, semi-oval-shaped, semi-square, wavy, etc.

In the embodiment, each secure protrusion 24 on first side could be connected with first secure structure 21 but separated from light module 25, or could be separated from first secure structure 21 but connected with light module 25. These details are not limited in the embodiment, it is only required that these secure protrusions 24 are located between light module 25 and first secure structure 21. In fact, whether any secure protrusion 24 is connected with anything, or even whether it is protrusion of first secure structure 21 or protrusion of light module 25 is not important in the embodiment.

Similarly, each secure protrusion 24 on second side could be connected with second secure structure 22 but be separated from light module 25, or could be separated from second secure structure 22 but connected with light module 25. Moreover, each secure protrusion 24 on third side could be connected with third secure structure 23 but separated from light module 25, or could be separated from third secure structure 23 but connected with light module 25. Herein, whether any secure protrusion 24 is protrusion of second secure structure 22, protrusion of third secure structure 23, or protrusion of light module 25 is not important in the embodiment.

Besides, in order to avoid the effect on propagation of light from light module 25 to light assembly caused by secure protrusions 24, the distance between each secure protrusion 24 and light assembly is usually kept longer than the distance between light module 25 and light assembly. Certainly, the object could also be achieved by forming secure protrusions 24 with transparent material or other possible ways, and these details are not limited in the embodiment.

Compare with the prior art, an essential difference is clearly shown in the top-view figure. In the prior art, the distance between the secure frame and the light module is keep a constant, but the present embodiment, the distance between the secure frame and the light module is variable. In the present embodiment, the distance between the secure frame and light module 25 is shorter while there are secure protrusions 24 and is larger while there is not any secure protrusions 24. Therefore, by adjusting the location/size of each secure protrusions 24 and the distance between light module 25 and secure structures 21/22/23, the secure protrusion 24 could provide the essential support to light module 25 and secure structure 21/22/23 could provide the elastic space to absorb the variation, such as movement and inflation, of the light module induced by thermal or optical factor(s).

In general, for the same light module 25, the distance between light module 25, any secure protrusion 24, and secure structure 21/22/23 in the embodiment is usually kept approximately equal to the distance between light module and secure frame in the prior art. And, the distance between light module 25 and secure structure 21/22/23, without any secure protrusion 24 in-between, is longer than the distance between light module and secure frame in the prior art.

For example, each secure protrusion 24 in the embodiment can be adjusted according to the following conditions. Surely, each following condition could be independently used without combining other condition(s):

(1) The projection of some secure protrusions 24 deployed along the first side on first secure structure 21 is no larger than one third of the length of first secure structure 21. And the projection of some secure protrusions 24 deployed along the second side on second secure structure 22 is no larger than one third of the length of second secure structure 22. Such conditions are offered to make sure that the light module 25 is not supported only by secure protrusions 24 but by both secure protrusions 24 and secure structure 21/22/23, which is the featuring function of the invention.

(2) The projection of some secure protrusions 24 deployed along the third side on third secure structure 23 is no larger than one third of the length of third secure structure 23. Such conditions are offered to make sure that the light module 25 is not supported only by secure protrusions 24 but by both secure protrusions 24 and secure structure 21/22/23, which is the featuring function of the invention.

(3) The length of secure protrusion 24 deployed in the direction of third side along the first side is about three fifths of the distance between first secure structure 21 and light module 25. And the length of secure protrusion 24 deployed in the direction of third side along the second side is about three fifths of the distance between second secure structure 22 and light module 25. The condition is acquired by experiments and is good for both effectively supporting light module 25 and preventing from deformation/crack.

(4) The length of secure protrusion 24 deployed in the direction of first side along the third side is about three fifths of the distance between third secure structure 23 and light module 25. The condition is acquired by experiments and is good for both effectively supporting light module 25 and preventing from deformation/crack.

(5) The length of secure protrusion 24 deployed in the direction of first side along the first side is about one twentieth of the distance between third secure structure 23 and light module 25. And the length of secure protrusion 24 deployed in the direction of second side along the second side is about one twentieth of the distance between third secure structure 23 and light module 25. The condition is to ensure secure protrusions 24 on first and second side are strong enough to support light module 25.

(6) The length of secure protrusion 24 on third side along the third side is no shorter than one twentieth of the distance between first secure structure 21 and light module 25. The condition is to ensure secure protrusions 24 next to third side are strong enough to support light module 25.

Figure 3A:
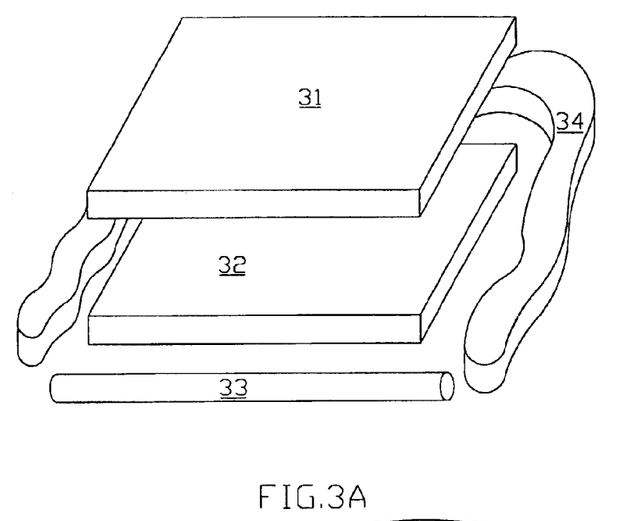
FIG. 3A to FIG. 3C show the essential structure of one preferred embodiment of the present invention.
Figure 3B:
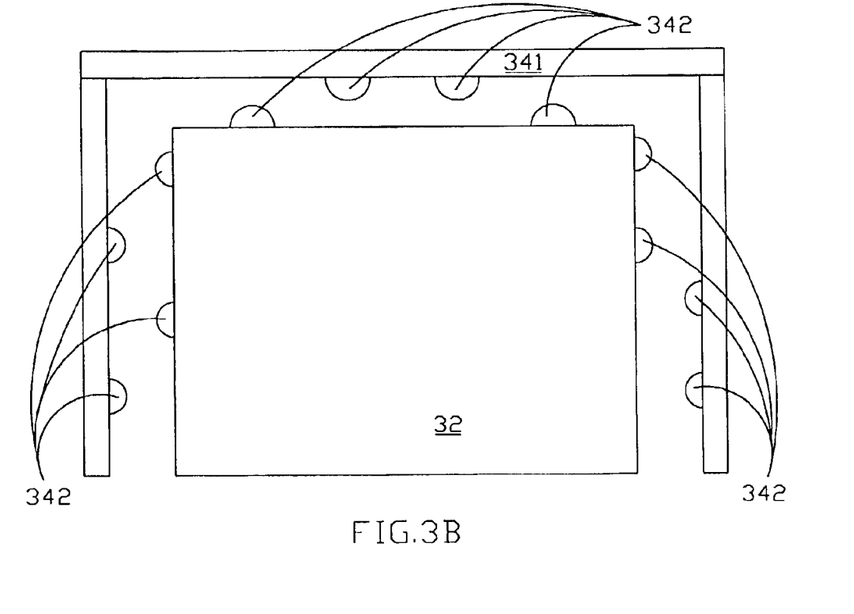
Figure 3C:
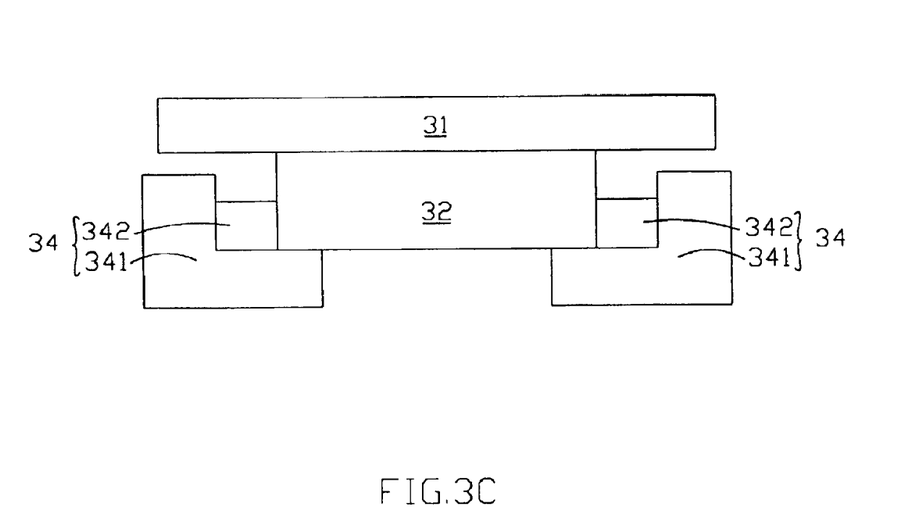

Another preferred embodiment of the invention is a liquid crystal display, shown in FIG. 3A to FIG. 3C, comprising: liquid crystal module 31, light guide 32, light source 33 and secure frame 34.

Liquid crystal module 31 comprises a plurality of liquid crystal cells. Light guide 32 is located closed to one side of liquid crystal module 31 and may contain light module such as light module and polarizing film. Light source 33 is located closed to one side of light module 32 that does not face liquid crystal module 31. Secure frame 34 surrounds light guide 32.

Obviously, secure frame 34 is the main characteristic(s) of the embodiment. Secure frame 34 could be divided into secure structure 341 and some secure protrusions 342. Secure structure 341 surrounds light module 32 but is separated from light module 32. Secure protrusions 342 are located between secure structure 341 and light module 32, but each secure protrusions 342 is only connected with one of the following: secure structure 341 or light module 32.

To avoid effect on normal operation of liquid crystal display, and more particularly, to avoid effect on normal propagation of light, generally specking, secure structure 341 is not located between light module 32 and liquid crystal module 31, or between light source 33 and light module 32. Moreover, the distance between each secure protrusions 342 and liquid crystal module 31 is larger than the distance between light module 32 and liquid crystal module 31.

Furthermore, as is discussed above, along any side of light module 32, the total length of projection of some secure protrusions 342 on light module 32 is no larger than one third of the length of secure structure 341 on that side. Moreover, along any side of light module 32, the width of each secure protrusions 342 located on this side between secure structure 341 and light module 32 is about two fifths of the distance between secure structure 341 and light module 32. Further, along any side of light module 32, the width of each secure protrusions 342 located on this side along the side is no shorter than one twentieth of the width of the side of light module 32.

Of course, it is to be understood that the invention need not be limited to these disclosed embodiments. Various modification and similar changes are still possible within the spirit of this invention. In this way, the scope of this invention should be defined by the appended claims.

What is claimed is:

1. A secure frame for light module, said secure frame being used to secure and support at least one light module, said light module comprising a light module and being located on the same side of a light assembly with said secure frame for light module, said secure frame for light module comprising:

a first secure structure, said first secure structure being located on a first side of said light module and being separated from said light module;

a second secure structure, said second secure structure being located on a second side of said light module and being separated from said light module, wherein said second side and said first side are two opposite sides of said light module;

a third secure structure, said third secure structure being located on a third side of said light module and being separated from said light module, wherein said third secure structure being connected with both said first secure structure and said second secure structure, wherein said third side being connected with both said first side and said second side; and at least a secure protrusion, said secure protrusion being located between said light module and at least one said secure structure.

2. The secure frame according to claim 1, wherein said secure protrusion is located between said first secure structure and said light module and is directly connected with said light module but separated from said first secure structure.

3. The secure frame according to claim 1, wherein said secure protrusion is located between said second secure structure and said light module and is directly connected with said second secure structure but separated from said light module or directly connected with said light module but separated from said second secure structure.

4. The secure frame according to claim 1, wherein said secure protrusion is located between said third secure structure and said light module and is directly connected with said third secure structure but separated from said light module or directly connected with said light module but separated from said third secure structure.

5. The secure frame according to claim 1, wherein the deployment of said secure protrusion along said first side and deployment of said secure protrusion along said second side are symmetrical to each other.

6. The secure frame according to claim 1, wherein the deployment of said secure protrusion along said third side are symmetrical on both left and right sides.

7. The secure frame according to claim 1, wherein the shape of any said secure protrusion can be different from that of any other of said secure protrusion.

8. The secure frame according to claim 1, wherein the projection of said secure protrusion on said first secure structure along said first side is no larger than one third of the length of said first secure structure, and the projection of said secure protrusion on said second secure structure along said second side is no larger than one third of the length of said second secure structure.

9. The secure frame according to claim 1, wherein the projection of said secure protrusion on said third secure structure in the direction of said third side along said third side is no larger than one third of the length of said third secure structure.

10. The secure frame according to claim 1, wherein the length of any of said secure protrusion along said third side is about three fifths of the distance between said first secure structure and said light module, and the length of any of said secure protrusion along said third side being about three fifths of the distance between said second secure structure and said light module.

11. The secure frame according to claim 1, wherein the length of any of said secure protrusion on said third side along said first side is about three fifths of the distance between said third secure structure and said light module.

12. The secure frame according to claim 1, wherein the length of any of said secure protrusion on said first side along said first side is about one twentieth of the distance between said third secure structure and said light module, and the length of any of said secure protrusions on said second side along said second side is no shorter than one twentieth of the distance between said third secure structure and said light module.

13. The secure frame according to claim 1, wherein the length of any of said secure protrusion on said third side along said third side is no shorter than one twentieth of the distance between said first secure structure and said light module.

14. The secure frame according to claim 1, wherein the distance between any of said secure protrusion and said light assembly is longer than the distance between said light module and said light assembly.

15. A liquid crystal display, comprising:
a liquid crystal module, comprising a plurality of cells;
a light module, located on one side of said liquid crystal module;
a light source, located on the side of said light module that does not face said liquid crystal module; and
a secure frame, surrounding said light module, comprising:
a secure structure, said secure structure surrounding said light module and being separated from said light module; and
a plurality of secure protrusions, said secure protrusions being located between said secure structure and said light module, wherein any of said secure protrusions being connected with only one of the following: said secure structure or the light module.

16. The liquid crystal display according to claim 15, wherein said secure protrusions are deployed in symmetry on both left and right sides.

17. The liquid crystal display according to claim 15, wherein the distance between any of secure protrusions and said liquid crystal module is larger than the distance between said light module and said liquid crystal module.

18. The liquid crystal display according to claim 15, wherein along any side of said light module, the projection of some said secure protrusions located on said side on said light module is no larger than one third of the length of said secure structure.

19. The liquid crystal display according to claim 15, wherein along any side of said light module, the width of any of said secure protrusions located on said side between said secure structure and said light module is about two fifths of the distance between said secure structure and said light module.

20. The liquid crystal display according to claim 15, wherein along any side of said light module, the width of any of said secure protrusions located on said side is no shorter than one twentieth of the width of said side of said light module.

* * * * *